(12) United States Patent
Naamad et al.

(10) Patent No.: US 10,409,729 B1
(45) Date of Patent: Sep. 10, 2019

(54) CONTROLLING AGGREGATE READ HIT RATE ACROSS A HIERARCHY OF CACHE LEVELS BY PARTITIONING RESPONSIBILITY FOR CACHING AMONG THE CACHE LEVELS

(71) Applicant: EMC Corporation, Hopkinton, MA (US)

(72) Inventors: Amnon Naamad, Brookline, MA (US); Sean Dolan, Southborough, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 428 days.

(21) Appl. No.: 15/086,276

(22) Filed: Mar. 31, 2016

(51) Int. Cl.
G06F 12/00 (2006.01)
G06F 12/0897 (2016.01)

(52) U.S. Cl.
CPC .... *G06F 12/0897* (2013.01); *G06F 2212/604* (2013.01)

(58) Field of Classification Search
CPC ................. G06F 12/0897; G06F 2212/604
See application file for complete search history.

(56) References Cited

U.S. PATENT DOCUMENTS

2005/0015554 A1* 1/2005 Zohar ............... G06F 3/0607
711/119
2017/0220592 A1* 8/2017 Foltz ............... G06F 17/3097

* cited by examiner

*Primary Examiner* — Gurtej Bansal
(74) *Attorney, Agent, or Firm* — Anderson Gorecki LLP

(57) ABSTRACT

Control over the overall data cache hit rate is obtained by managing partitioning caching responsibility by address space. Data caches determine whether to cache data by hashing the data address. Each data cache is assigned a range of hash values to serve. By choosing hash value ranges that do not overlap, data duplication can be eliminated if desired, or degrees of overlap can be allowed. Control over hit rate maximization of data caches having best hit response times is obtained by maintaining separate dedicated and undedicated partitions within each cache. The dedicated partition is only used for the assigned range of hash values.

20 Claims, 5 Drawing Sheets

CONTROLLING AGGREGATE READ HIT RATE ACROSS A HIERARCHY OF CACHE LEVELS BY PARTITIONING RESPONSIBILITY FOR CACHING AMONG THE CACHE LEVELS

BACKGROUND

The subject matter of this disclosure is generally related to hierarchical data caches. Data caches may be arranged hierarchically within a single device and between devices in a network. For example, hierarchical data caches may exist in a data storage system that is used to maintain large data sets and support multiple concurrent users. An exemplary data storage system may include multiple storage arrays. Each storage array may include multiple computing nodes, each of which may have a data cache. The computing nodes manage access to tangible data storage devices. Each storage array presents one or more logical volumes of storage to host devices, each of which may have a data cache. The computing nodes maintain an abstraction layer between the logical volumes and the tangible data storage devices. Instances of applications running on the host devices may access the logical volumes by sending IOs to the storage arrays. Data may be copied to one or more of the caches in order to service the IOs.

SUMMARY

All examples, aspects and features mentioned in this document can be combined in any technically possible way.

In accordance with an aspect an apparatus comprises: a data storage system comprising a first level cache and a second level cache arranged with respect to persistent storage such that the second level cache is hierarchically between the first level cache and the persistent storage, the first level cache and the second level cache each having an undedicated partition and a dedicated partition; and at least one processor that: configures the dedicated partition of the first level cache to store only data from a first address space of the persistent storage; determines a size for the undedicated partition of the first level cache, the undedicated partition of the first level configured to store data that is not from the first address space of the persistent storage; configures the dedicated partition of the second level cache to store only data from a second address space of the persistent storage, wherein the data from the persistent storage is propagated through the second level cache and the first level cache to a requester; determines a size for the undedicated partition of the second level cache, the undedicated partition of the second level configured to store data that is not from the second address space of the persistent storage. In some implementations the at least one processor applies a hash function to a data address to identify the first address space and the second address space. In some implementations the at least one processor calculates minimized hierarchy access overhead as a function of size of the dedicated partition of the first level cache and hash values assigned to the first level cache. In some implementations the at least one processor applies a hash function to a LUN number and track number to identify the first address space and the second address space. In some implementations the first address space and the second address space are at least partially overlapping. In some implementations comprising a plurality of additional cache levels, the at least one processor configures respective dedicated partitions and undedicated partitions for the additional cache levels by grouping the first cache level, second cache level and additional cache levels into layer groups. In some implementations the processor groups consecutive cache levels into ones of the layer groups based on similarity. In some implementations the processor groups consecutive pairs of cache levels into the layer groups. In some implementations, for each layer group independently, the at least one processor calculates minimized hierarchy access overhead. In some implementations each layer group comprises dedicated partition that supports all address space of persistent storage.

In accordance with an aspect a method comprises in a data storage system comprising a first level cache and a second level cache arranged with respect to persistent storage such that the second level cache is hierarchically between the first level cache and the persistent storage, the first level cache and the second level cache each having an undedicated partition and a dedicated partition: configuring the dedicated partition of the first level cache to store only data from a first address space of the persistent storage; determining a size for the undedicated partition of the first level cache, the undedicated partition of the first level configured to store data that is not from the first address space of the persistent storage; configuring the dedicated partition of the second level cache to store only data from a second address space of the persistent storage, wherein the data from the persistent storage is propagated through the second level cache and the first level cache to a requester; and determining a size for the undedicated partition of the second level cache, the undedicated partition of the second level configured to store data that is not from the second address space of the persistent storage. In some implementations the method comprises applying a hash function to a data address to identify the first address space and the second address space. In some implementations the method comprises calculating minimized hierarchy access overhead as a function of size of the dedicated partition of the first level cache and hash values assigned to the first level cache. In some implementations the method comprises applying a hash function to a LUN number and track number to identify the first address space and the second address space. In some implementations the method comprises configuring the first address space and the second address space as at least partially overlapping. In some implementations wherein a plurality of additional cache levels exist the method comprises configuring respective dedicated partitions and undedicated partitions for the additional cache levels by grouping the first cache level, second cache level and additional cache levels into layer groups. In some implementations the method comprises grouping consecutive cache levels into ones of the layer groups based on similarity. In some implementations the method comprises grouping consecutive pairs of cache levels into the layer groups. In some implementations the method comprises independently calculating minimized hierarchy access overhead for each layer group. In some implementations the method comprises configuring each layer group with dedicated partition that supports all address space of persistent storage.

DETAILED DESCRIPTION

Some aspects, features and implementations described herein may comprise computer devices, components and computer-implemented steps or processes. It should be apparent to those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of tangible processor devices. For ease of exposition, not every step, process or element is described herein as part of a computer system. Those of ordinary skill in the art will recognize steps, processes and elements that may have a corresponding computer system or software component. Such computer system and software components are therefore enabled by describing their corresponding steps, processes or elements, and are within the scope of the disclosure.

The terminology used in this description is intended to be interpreted broadly within the limits of subject matter eligibility. The terms "logical" and "virtual" are used to refer to features that are abstractions of other features or tangible devices. For example, multiple virtual computing devices could operate simultaneously on one tangible computing device. A "host application" is a computer program that accesses a storage service from a storage system via a storage network. A "production volume" is a logical unit of storage presented by a storage system for use by host applications. The storage system manages the underlying tangible storage devices used to implement the storage services for the production volume. Without limitation, the production volume may be referred to as a production LUN or host LUN, where LUN (logical unit number) is a number used to identify the production volume in accordance with the SCSI (small computer system interface) protocol. Multiple production volumes may be organized as a storage group.

Figure 1:
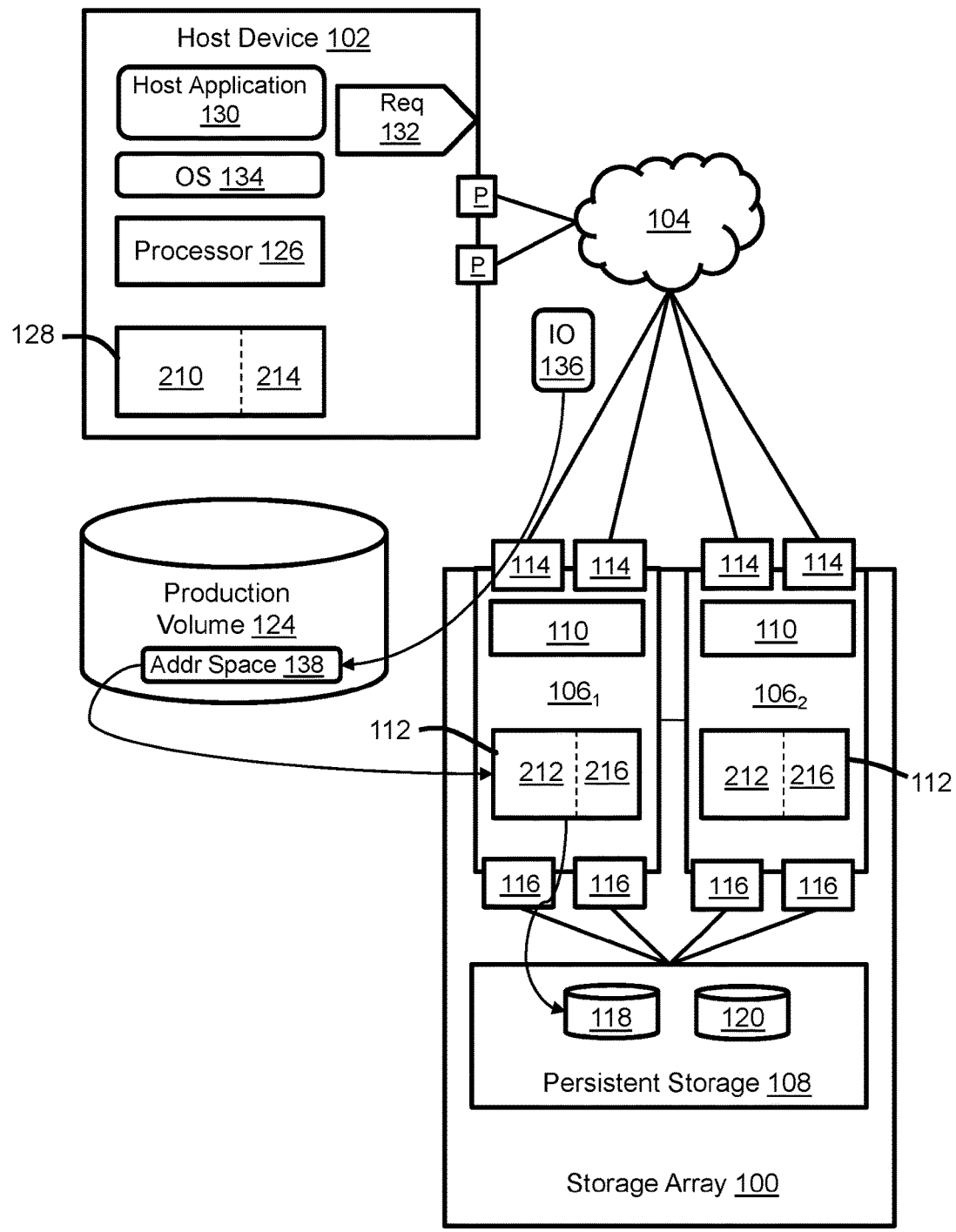
FIG. 1 illustrates a data storage system with a two-layer cache hierarchy.

FIG. 1 illustrates an exemplary data storage system with a data storage array 100 and a host device 102. Any number of host devices and storage arrays could be included in the data storage system although a single host device and single storage array are shown for explanatory purposes. The host device 102 is connected to the storage array 100 via a storage network 104. The storage network 104 may include various network nodes, e.g. switches, routers, hubs, and other network devices, and may include one or more of the Internet, a WAN (wide area network), MAN (metropolitan area network) and LAN (local area network).

The storage array 100 includes one or more interconnected computing nodes $106_1$-$106_2$ and persistent storage 108. The computing nodes $106_1$-$106_2$ may include "vanilla" storage servers and specialized hardware platforms including but not limited to storage directors and storage engines that are designed for use in storage arrays. Each computing node includes at least one multi-core processor 110 and a cache 112. The cache 112 may include, for example and without limitation, volatile memory such as RAM (random access memory). Each computing node is connected to every other computing node in the storage array via point-to-point links of an interconnecting fabric. Computing nodes may allocate a portion of their respective cache 112 to a shared "global" cache that can be accessed by other computing nodes via the fabric. For example, the fabric may support RDMA (remote direct memory access) between computing nodes. The computing nodes include FAs (front-end adapters) 114 for communicating with the host device 102, and DAs (disk adapters) 116 for communicating with persistent storage 108. The persistent storage 108 may include sets of tangible data storage devices of various different technology types, for example and without limitation a set of SSD "flash" drives 118 and a set of HDDs (hard disk drives) 120. The computing nodes $106_1$, $106_2$ maintain at least one logical production volume 124 that is backed by persistent storage 108. The production volume represents an abstraction layer between the host device 102 and persistent storage 108.

The host device 102 is a computer, e.g. a tangible server computer. Host visualization is known and may be implemented using containers or a hypervisor and virtual machines on a tangible server. The host device includes a multi-core processor 126 and a data cache 128. The cache may include RAM. The host device 102 supports operation of a host application 130 that utilizes the storage services of the storage array 100. More particularly, the host application utilizes the production volume 124 which is presented to the host device 102 by the storage array 100. There may be any number of host applications running on the host device, e.g., in containers or on virtual machines. Examples of host applications include but are not limited to a database, file server and block server. Each host device includes one or more ports P. The host ports are connected to the storage network 104, and each host port may be associated with a network path to a particular storage array port associated with an FA 114. Any number of ports may be included and the hosts do not necessarily have access to all of the front end ports and FAs.

Data is temporarily placed in the host cache 128 and the storage array cache 112 while being copied between the host application 130 and the persistent storage 108. For example, host application 130 may prompt caching by generating a request 132 to read data. In response to the request 132, an OS (operating system) 134 running on the host (e.g., an OS associated with a virtual machine or container) refers to the host cache 128 to determine whether the data is resident in the host cache. If the data is resident, i.e. in the case of a "cache hit," the data is provided to the host application from the cache. If the data is not resident in the host cache 152, i.e. in the case of a "cache miss," then an IO 136 is generated and sent to the storage array 100 via the storage network 104. The IO 136 indicates an address space 138 of production volume 124. The IO 136 is received on an FA 114 of one of the computing nodes, e.g. computing node $106_1$, and queued for service. Depending on the specific implementation of the storage array the computing node $106_1$ refers to its local cache 112, shared global cache, or both to determine whether the data is resident in cache in the storage array. If the data is resident in cache (cache hit) then the data is provided to the host device 102 where it is copied to host cache 128 and provided to the host application. If the data is not resident in cache (cache miss) then the data is copied from persistent storage 108 to cache 112 of the computing node $106_1$. The data is then provided to the host device 102 where it is copied to host cache 128 and provided to the host application. Consequently, the data may become resident in both storage array cache 112 and host cache 128.

When host application 130 generates request 132 in order to write data, the data is copied to the host cache 128 and used to generate IO 136. One of the computing nodes receives the IO and copies the data to cache 112. The data is eventually destaged from cache 112 to persistent storage 108. However, the data may become resident in both cache 128 and cache 112. Data may be also copied to the cache 128 and cache 112 in response to a hint, resulting in overlapping caching.

Figure 2:
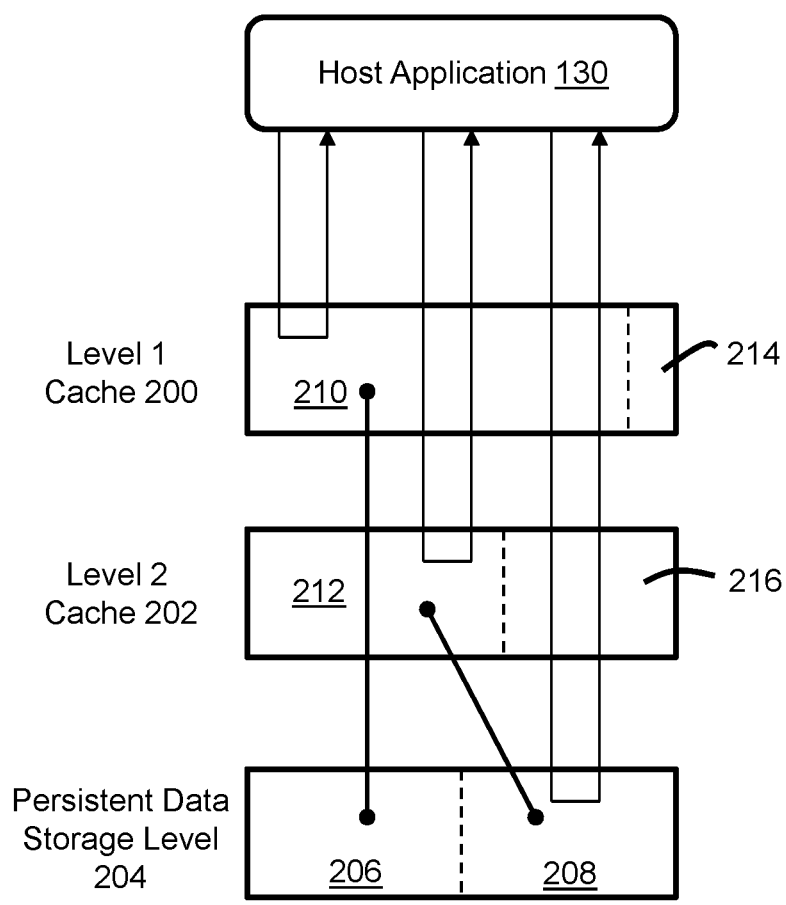
FIG. 2 illustrates optimization of the hierarchical caches of FIG. 1.

FIG. 2 illustrates a generalization of the cache hierarchy of FIG. 1. The level 1 cache 200 corresponds to host device cache 128. The level 2 cache 202 corresponds to storage array cache 112, i.e. computing node cache or global shared cache depending on implementation. The third level of the hierarchy is a persistent data level 204 corresponding to persistent storage 108. Data access requests flow in from the host application 130 to the level 1 cache 200, and proceed as deeply into the hierarchy as needed to satisfy the request. In the case of reads, requests may be satisfied at any level or from the persistent data storage level. More particularly, a read request is satisfied by the first level encountered that contains the data. The response time for the read request may vary according to whether the request is satisfied from one of the cache levels 200, 202 or by accessing the persistent data storage level 204. In general, the read response time (RtHit1) for a cache hit at level 1 is less than the read response time (RtHit2) for a cache hit at level 2, which is less than the read response time (RtMiss) when retrieving data from the persistent data storage level. Depending on factors including but not limited to the particular technologies used in the different data caches and the data processing and transfer limits associated with traversing layers of the hierarchy, the read hit times for RTHit1 and RTHit2 may be similar or dissimilar.

One measure of the effectiveness of a data cache is read hit percentage. Read hit percentage is the percentage of read operations that can be satisfied from a cache as a function of the size of the cache. Read hit percentage can be represented as a function or curve, e.g. cache size on the X-axis and cache hit % (read hit rate) of the Y-axis. At lower cache sizes the curve tends to increase steeply in the Y-axis because a size increase enables frequently accessed data to be loaded into cache. Examples of such data may include database index blocks or file system metadata. The curve tends to level out as the size of the set of very active data is reached, e.g., when further increases in size accommodate less frequently accessed data. The leveling tends to occur before reaching 100% read hit rate because caches tend not to be large enough to hold all non-idle data. The precise shape of the curve depends not just on the size of the cache, but also on the particular timing and locality of reference of the sequence of data access requests that are processed during the measurement of the curve.

Performance of the cache hierarchy depends on the relation of cache size to hit rate for the prevailing workloads, and also on the relative sizes and relative performance characteristics of the individual cache levels. An optimal configuration balances between (1) the read hit rate of individual cache levels that provide relatively lower response times, and (2) the aggregate read hit rate over the entire hierarchy of cache levels. Control over the aggregate read hit rate over the entire hierarchy of cache levels may be exerted by partitioning responsibility for caching among the cache levels. In one implementation one or more of the cache levels 200, 202 may be assigned responsibility for some portion of the address space of the persistent data storage level, e.g. portion 206 assigned to level 1 cache 200 and portion 208 assigned to level 2 cache 202.

One or both of the illustrated level 1 cache 200 and the level 2 cache 202 may include a respective dedicated partition 210, 212 that is dedicated for storing data associated with a subset of the set of addresses of the persistent data level corresponding to the assigned address space portion 206, 208. In other words, partition 210 is used exclusively for data found in the address space of portion 206 and partition 212 is used exclusively for data found in the address space of portion 208. The address space subset assigned to level 1 cache and the address space subset assigned to level 2 cache may be mutually exclusive, although that should not be viewed as a limitation. When data associated with the subset of addresses of the persistent data level assigned to a particular cache level is received at that cache level, the data is copied to the dedicated partition at that cache level. When data that is not associated with the subset of addresses of the persistent data level assigned to a particular cache level is received at that cache level, the data is copied to an undedicated partition at that level, e.g. undedicated partitions 214 and 216. The undedicated partitions enable exertion of control over the read hit rate of individual cache levels that provide relatively better (lower) response times. In general, the larger the size of the undedicated partition, the greater the hit rate of that particular cache level. Data may be flushed from both the dedicated and undedicated partitions based on aging, inactivity and any of various techniques known in the art.

Figure 3:
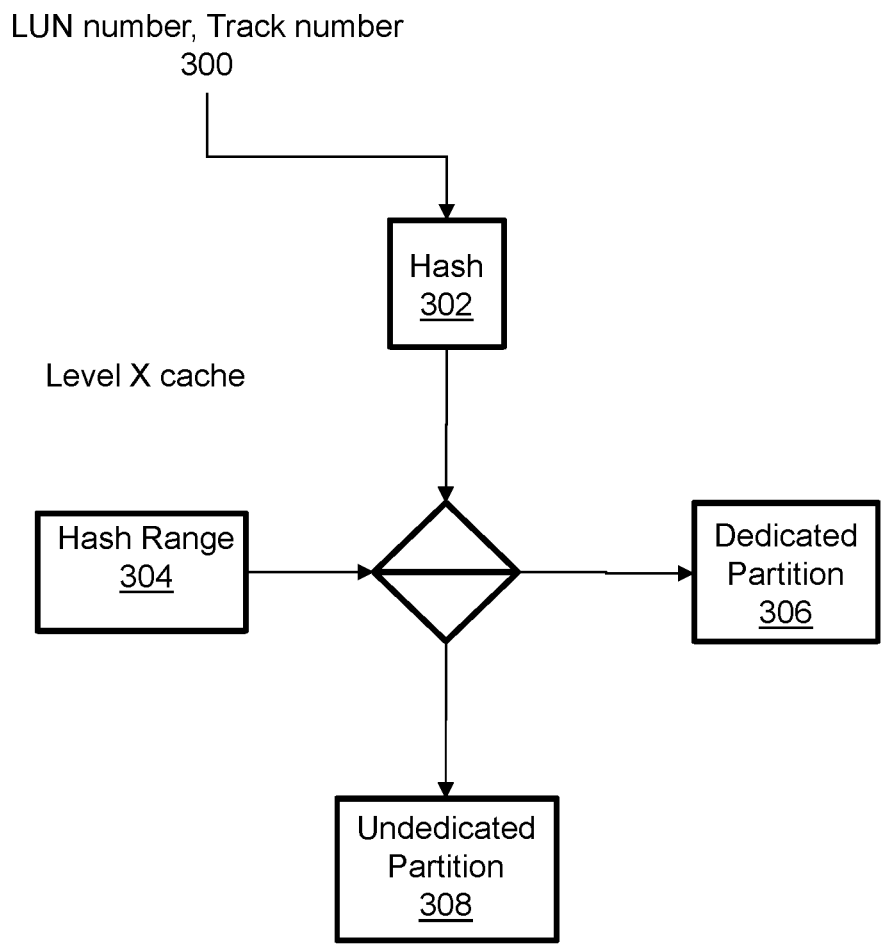
FIG. 3 illustrates a technique for determining whether to utilize a dedicated cache partition or an undedicated cache partition for data based on LUN number and track number.

Referring to FIG. 3, one technique for associating addresses with dedicated partitions is to apply a hash function to the data addresses. For example and without limitation, if data requests indicate a LUN number and a track number 300, a hash function 302 could be applied to the LUN and track numbers. The calculation may be performed at each cache level. If the calculated hash value for an address falls into a hash value range 304 assigned to the data cache at the cache level then the data cache will copy the data to the dedicated partition as indicated in block 306. Each cache level can be assigned a unique set of hash values to serve, thereby defining the hash range 304 for a particular level and dedicated partition. By selecting hash value ranges that do not overlap it is possible to avoid data caching duplication, if desired. Some degree of data caching overlap could be allowed under control via selection of the hash value ranges. If the calculated hash value for an address does not fall into the hash value range 304 assigned to the data cache at the cache level then the data cache will copy the data to the undedicated partition as indicated in block 308. The address range assignment partitioning scheme allows partitioning to define non-overlapping, partially-overlapping or completely overlapping partitioning.

Referring again to FIG. 2, a hierarchy access overhead algorithm may be used to calculate configuration settings to optimize the hierarchical data cache. Variables used for calculations for a two level cache hierarchy may include representations of (1) the range of hash values assigned to the level 1 cache 200 (the remainder of the range being assigned to the level 2 cache 202); and (2) the size of the dedicated partition 210 and undedicated partition 214 on the level 1 cache (the level 2 cache may initially be considered to have an unassigned partition 216 of size zero and an assigned partition 212 of the entire size of the level 2 cache). It is assumed that the hit rate curves (hit rate as a function of cache size) are available for the data cache levels, e.g. and without limitation obtained by some combination of measurement and extrapolation. Even if hit rate curve data is not available it may be possible to calculate an adequate approximation of the hit rate curve data by using typical shapes of hit rate curves and fitting them to the observed values of hit rate vs. cache size for the current workload. It is also assumed that the hash function has been normalized to return values in the range of 0 to 1. Hierarchy access overhead which is to be minimized can be expressed as follows:

Hierarchy Access Overhead=$((HP1\_O+ HP1\_U)*RtHit1)+(H2*RtHit2)+(RtMiss*(1-(S1P\_Dedicated+S1P\_Undedicated+H2)))$, where the following variables represent the indicated values:
S1: Size of level 1 cache (Cache1)
S2: Size of level 2 cache (Cache2)
RtHit1: Overhead of cache Hit on Cache1
RtHit2: Overhead of cache Hit on Cache2
RtMiss: Overhead of a cache Miss
HRC(cache_size): Hit rate curve (hit rate as a function of cache size)
S1P_Dedicated: Size of Cache1 partition 210 used for assigned address space
S1P_Undedicated: Size of Cache1 partition 214 used for unassigned address space
HV1: Hash values less than HV1 are assigned to Cache1
Hit on S1P_Dedicated: $HP1\_O=HRC(S1P\_Dedicated/HV1)$
Hit on S1P_Undedicated: $HP1\_U=HRC(S1P\_Undedicated/(1-HV1))$
Hit on Cache2: $H2=HRC(S2/(1-HV1))-HP1\_U$ The result of the calculation is dependent on which values are selected for HV1, S1P_Dedicated and S1P_Undedicated. Because S1P_Dedicated+S1P_Undedicated=S2, it is only necessary to select HV1 and S1P_Dedicated. Because the shape of the manifold is not erratic (given the structure of the HRC curves), a 2-dimensional divide-and-conquer technique may be used to yield a result to the minimization calculation.

Figure 4:
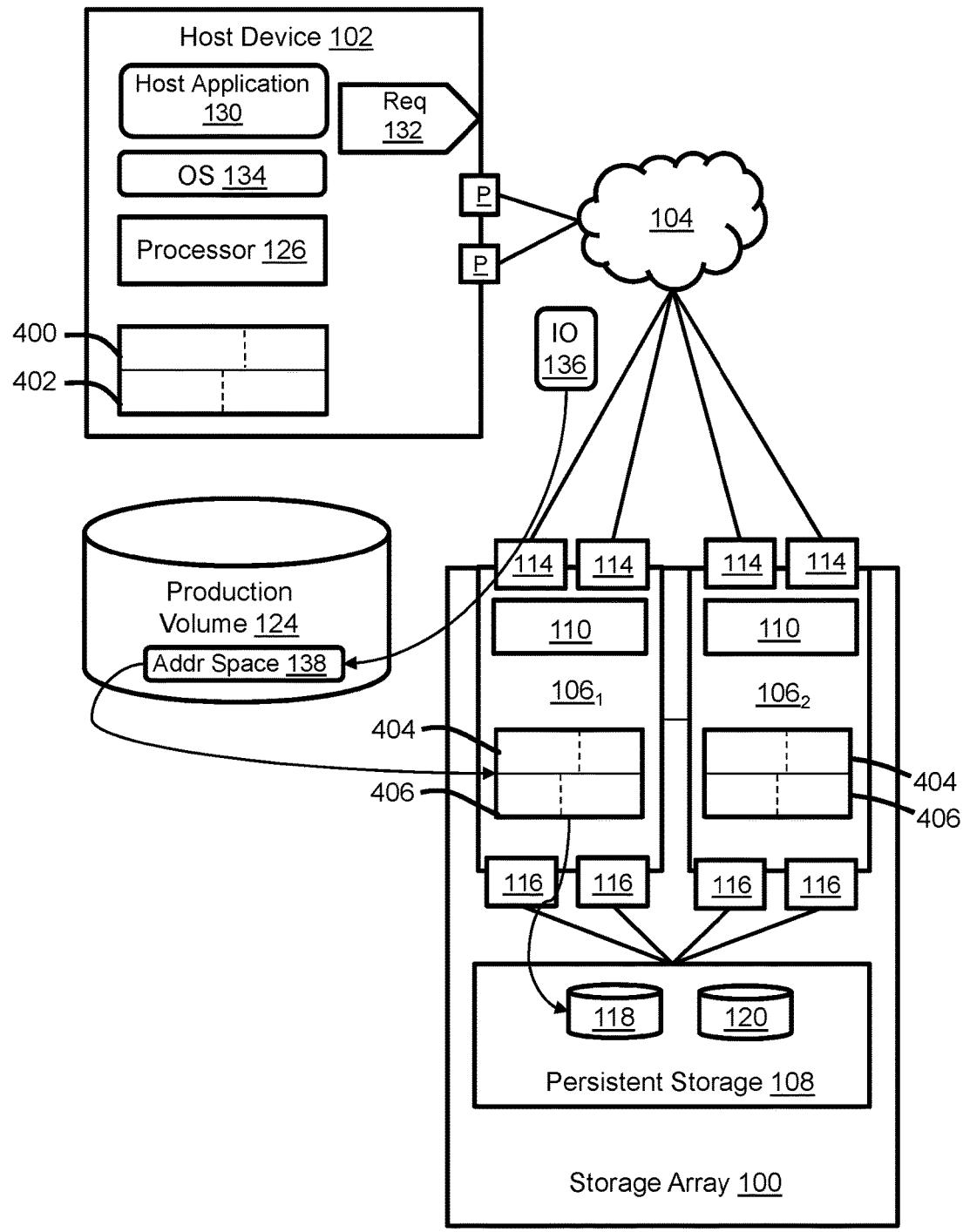
FIG. 4 illustrates a data storage system with an n-layer cache hierarchy.

Referring to FIG. 4, the data storage system may include more than two cache levels. For example, the host device may include volatile RAM cache 400 and non-volatile SSD cache 402. Further, the computing nodes of storage array 100 may include volatile RAM cache 404 and non-volatile SSD cache 406. Based on differences of performance and usage cache 400 may be considered as level 1, cache 402 as level 2, cache 404 and level 3, and cache 406 as level 4. Each level may include dedicated and undedicated partitions.

Figure 5:
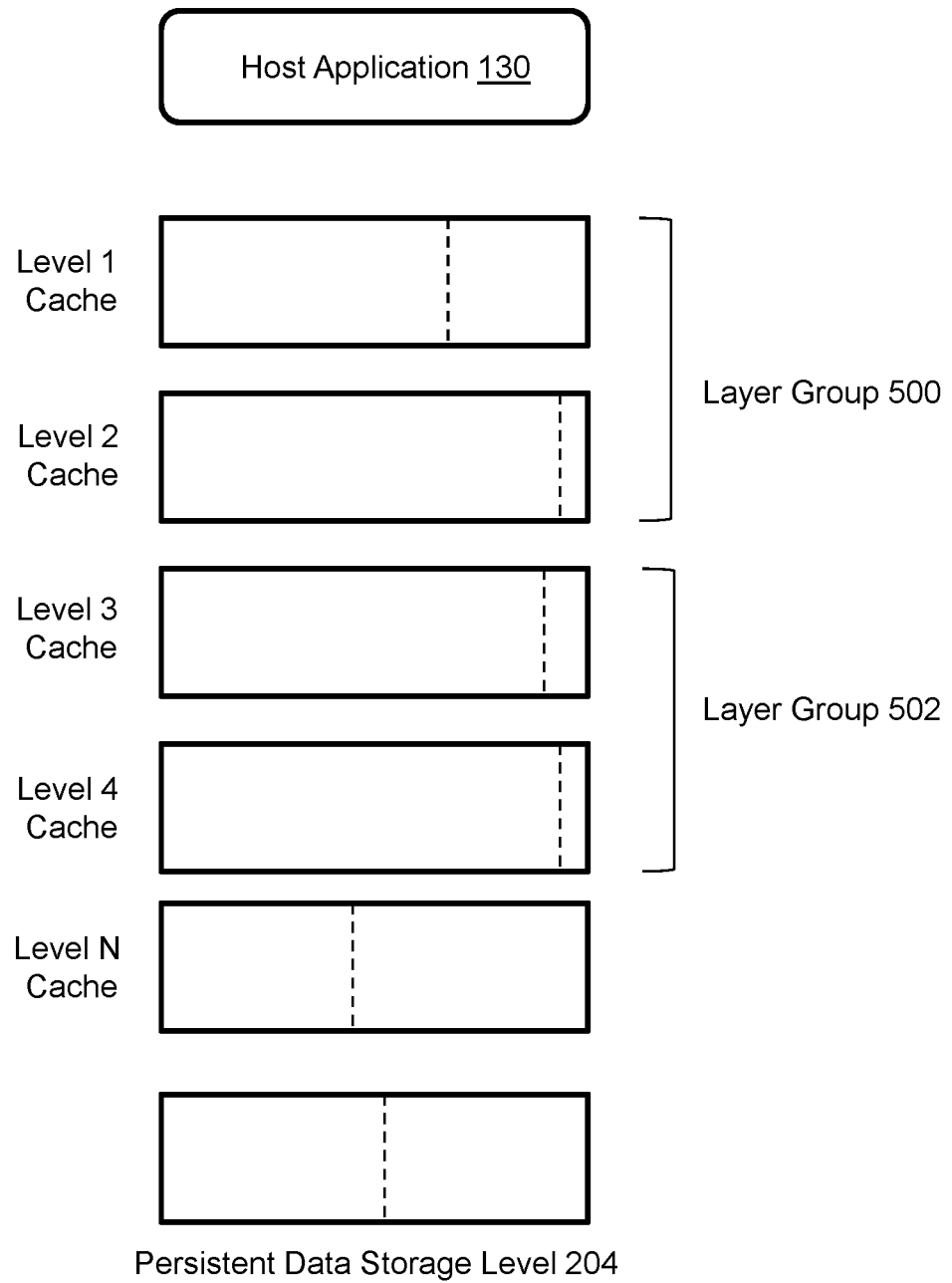
FIG. 5 illustrates optimization of the hierarchical caches of FIG. 4 using layer groups.

Referring to FIG. 5, the technique described above may be used to balance data duplication and individual data cache hit rate optimization to cache hierarchies of any depth, i.e. any number of levels. A wide variety of techniques may be employed for handling computational complexity associated with the larger number of degrees of freedom. In one implementation optimization is performed on layer groups 500, 502 that are groups of consecutive cache levels in the hierarchy. Optimization is performed within the scope of each group, but not necessarily across the groups. In some implementations each layer group collectively services the entire address space of the persistent data storage level 204. The group optimizations may be performed starting from the top group, e.g. layer group 500, and moving down the hierarchy, or from the bottom group and moving up the hierarchy. In one implementation of a bottom-up group-wise approach layer groups of no more than two cache levels are formed with a preference to place consecutive cache levels that have similar read hit response time in the same group. This has the desirable property that for each class of response time service, assessed in terms of read hit response time, it will tend to give the whole address range an equal opportunity at gaining access to that class of response time. This algorithm can be implemented in a single pass because the optimization for each layer group can be performed using the two-layer technique described above. Working up from the bottom of the cache hierarchy, for example, layer groups of up to two data caches to process are identified. When a layer group is identified, the parameters for the layer group are calculated using the two-layer hierarchy scheme, the difference being that if there is a data cache level below the current data cache layer group then the overall response time for that underlying data cache is used instead of RTMiss. The rules for defining processing layer groups work up from the bottom of the cache hierarchy (closest to the persistent data layer) may be expressed as follows:

Rule 1: If there are only two data cache levels remaining, process them using the two-layer technique as described above.

Rule 2: If there are three or more data cache levels remaining, and the cache levels are sufficiently different, then process the next two data cache levels as a layer group (using the expected RT of the data cache level below instead of RTMiss).

Rule 3: If the next two data cache levels are sufficiently similar, process them as a layer group.

Rule 4: If the next two data cache levels are not sufficiently similar, but the two data cache levels above are sufficiently similar, make the next level and single level that is assigned the whole address range, and treat the next two data cache levels as a layer group.

Another variant is to always form layer groups of two data cache levels until fewer than two data cache levels remain, regardless of performance characteristics.

Top-down implementations are also possible. Top-down variants may be more difficult to implement as single pass algorithms. When optimizing a given layer group it is necessary to know the cost of a miss from the layer group, which depends on knowing the aggregate cost of a read serviced by the data cache levels below the level being processed. However, algorithm calculations will not have reached those lower levels yet if processing is moving from the top level downwards. However initial estimates of layer-miss response time (the average cost of a miss from a layer group) may be compared to the algorithm results once a pass over the groups completes. If the estimates differ enough from the expected response times based on the optimized configuration, another pass of the algorithm can be performed where the estimates for the layer-misses are taken from the results from the previous pass.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:
1. An apparatus comprising:
a data storage system comprising a first level cache and a second level cache arranged with respect to persistent storage such that the second level cache is hierarchically between the first level cache and the persistent storage, the first level cache and the second level cache each having an undedicated partition and a dedicated partition; and at least one processor that:
configures the dedicated partition of the first level cache to store only data from a first address space of the persistent storage;
determines a size for the undedicated partition of the first level cache, the undedicated partition of the first level configured to store data that is not from the first address space of the persistent storage;
configures the dedicated partition of the second level cache to store only data from a second address space of the persistent storage, wherein the data from the persistent storage is propagated through the second level cache and the first level cache to a requester;
determines a size for the undedicated partition of the second level cache, the undedicated partition of the second level configured to store data that is not from the second address space of the persistent storage.

2. The apparatus of claim 1 wherein the at least one processor applies a hash function to a data address to identify the first address space and the second address space.

3. The apparatus of claim 1 wherein the at least one processor calculates minimized hierarchy access overhead as a function of size of the dedicated partition of the first level cache and hash values assigned to the first level cache.

4. The apparatus of claim 1 wherein the at least one processor applies a hash function to a LUN number and track number to identify the first address space and the second address space.

5. The apparatus of claim 1 wherein the first address space and the second address space are at least partially overlapping.

6. The apparatus of claim 1 comprising a plurality of additional cache levels, wherein the at least one processor configures respective dedicated partitions and undedicated partitions for the additional cache levels by grouping the first cache level, second cache level and additional cache levels into layer groups.

7. The apparatus of claim 6 wherein the processor groups consecutive cache levels into ones of the layer groups based on similarity.

8. The apparatus of claim 6 wherein the processor groups consecutive pairs of cache levels into the layer groups.

9. The apparatus of claim 6 wherein, for each layer group independently, the at least one processor calculates minimized hierarchy access overhead.

10. The apparatus of claim 9 wherein each layer group comprises a dedicated partition that supports all address space of persistent storage.

11. A method comprising:
in a data storage system comprising a first level cache and a second level cache arranged with respect to persistent storage such that the second level cache is hierarchically between the first level cache and the persistent storage, the first level cache and the second level cache each having an undedicated partition and a dedicated partition:
configuring the dedicated partition of the first level cache to store only data from a first address space of the persistent storage;
determining a size for the undedicated partition of the first level cache, the undedicated partition of the first level configured to store data that is not from the first address space of the persistent storage;
configuring the dedicated partition of the second level cache to store only data from a second address space of the persistent storage, wherein the data from the persistent storage is propagated through the second level cache and the first level cache to a requester; and
determining a size for the undedicated partition of the second level cache, the undedicated partition of the second level configured to store data that is not from the second address space of the persistent storage.

12. The method of claim 11 comprising applying a hash function to a data address to identify the first address space and the second address space.

13. The method of claim 11 comprising calculating minimized hierarchy access overhead as a function of size of the dedicated partition of the first level cache and hash values assigned to the first level cache.

14. The method of claim 11 comprising applying a hash function to a LUN number and track number to identify the first address space and the second address space.

15. The method of claim 11 comprising configuring the first address space and the second address space as at least partially overlapping.

16. The method of claim 11 wherein a plurality of additional cache levels exist, and comprising configuring respective dedicated partitions and undedicated partitions for the additional cache levels by grouping the first cache level, second cache level and additional cache levels into layer groups.

17. The method of claim 16 comprising grouping consecutive cache levels into ones of the layer groups based on similarity.

18. The method of claim 16 comprising grouping consecutive pairs of cache levels into the layer groups.

19. The method of claim 16 comprising independently calculating minimized hierarchy access overhead for each layer group.

20. The method of claim 19 comprising configuring each layer group with a dedicated partition that supports all address space of persistent storage.

* * * * *